Feb. 23, 1932.  H. M. COOK ET AL  1,846,249
APPARATUS FOR COATING FLANGED COUPLINGS
Filed Dec. 29, 1928  2 Sheets-Sheet 1
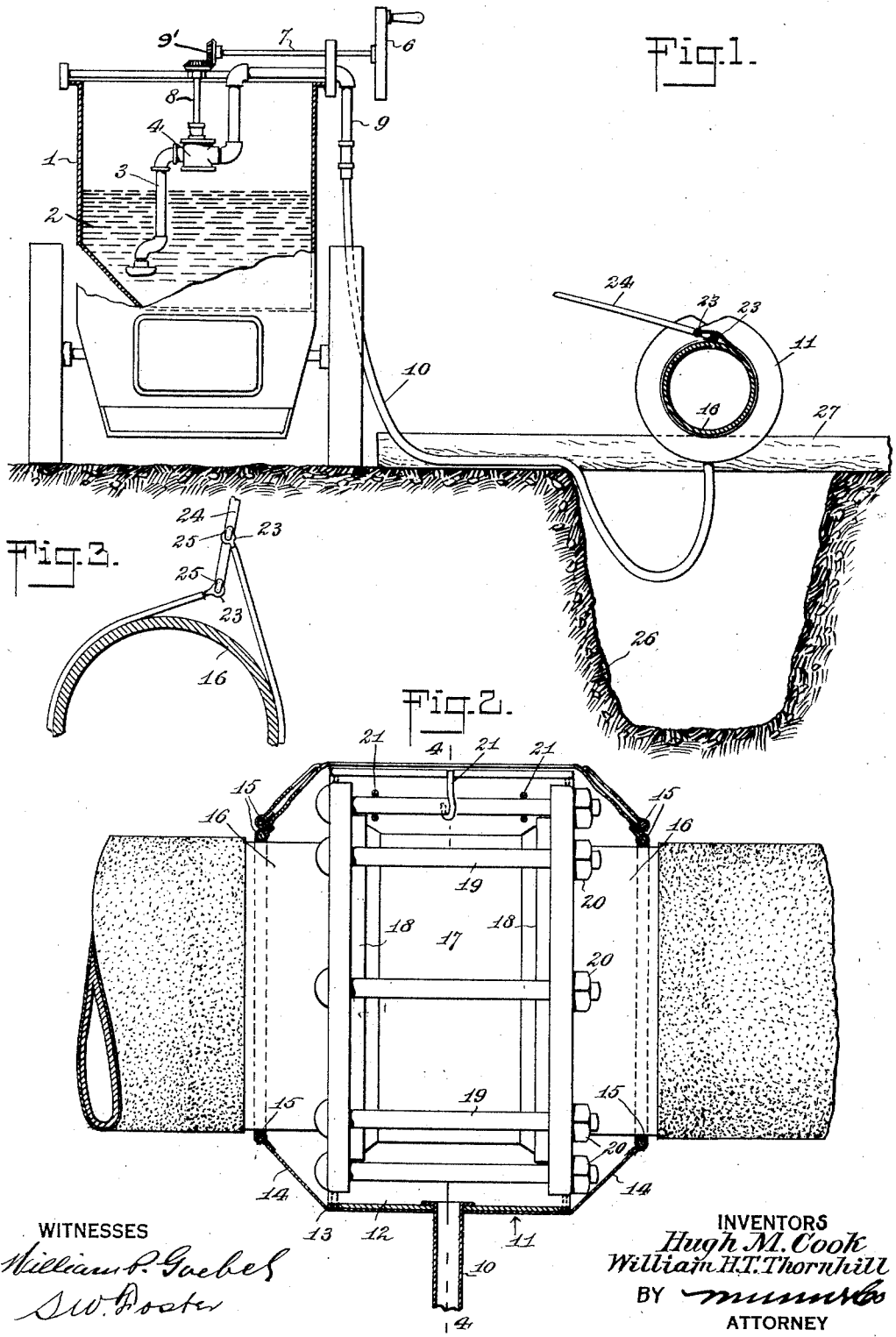

Feb. 23, 1932.  H. M. COOK ET AL  1,846,249
APPARATUS FOR COATING FLANGED COUPLINGS
Filed Dec. 29, 1928    2 Sheets-Sheet 2
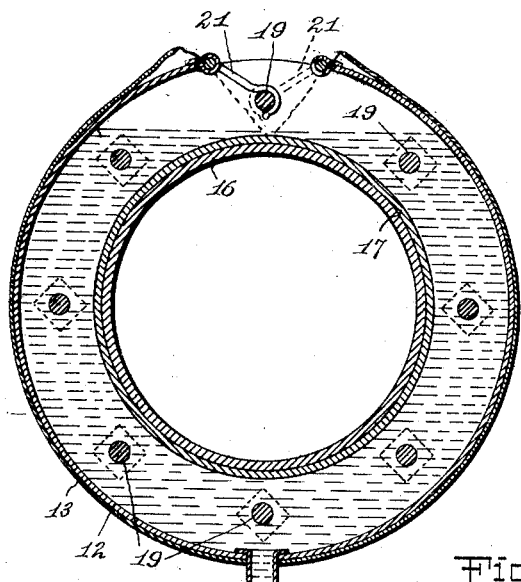
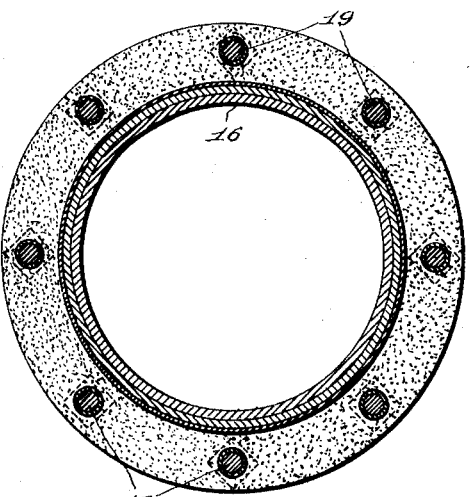
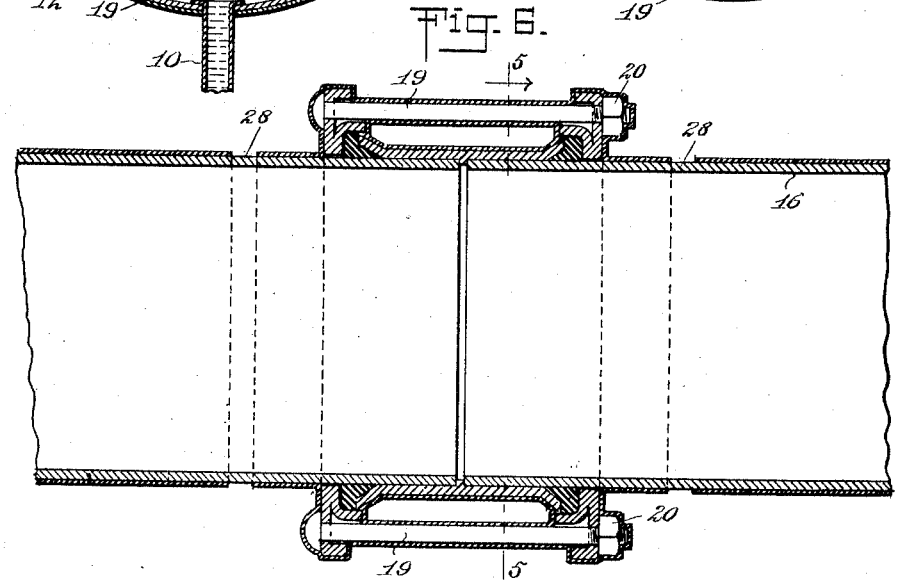
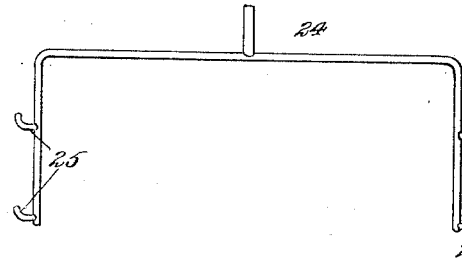
WITNESSES
INVENTORS
Hugh M. Cook
William H.T. Thornhill
BY
ATTORNEY Patented Feb. 23, 1932

1,846,249

UNITED STATES PATENT OFFICE

HUGH M. COOK, OF ELKINS PARK, PENNSYLVANIA, AND WILLIAM H. T. THORNHILL, OF FLORAL PARK, NEW YORK, ASSIGNORS TO WAILES, DOVE-HERMISTON CORPORATION, OF NEW YORK, N. Y., A CORPORATION OF NEW YORK

APPARATUS FOR COATING FLANGED COUPLINGS

Application filed December 29, 1928. Serial No. 329,259.

This invention relates to an apparatus for coating flanged couplings and more specifically to an apparatus which facilitates the coating of flanged and bolted pipe couplings while the couplings are in position on the pipe and in position to be lowered into a trench.

In pipe couplings such as commonly employed it is a difficult matter to properly coat the coupling and particularly the lower portion of the coupling and the lower bolts forming a part thereof, and it is the broad purpose of my invention to provide a removable casing adapted to be positioned around the coupling and through the bottom of which a supply of coating material is forced by means of a pump or other analogous device so that the coating material will rise in the casing and thoroughly coat the coupling and all of its parts, with the possible exception of an upper bolt and a portion of the upper part of the coupling, which can be readily coated by hand.

It is to be understood that we employ the term "coating" in its broadest sense to include any material which may flow in liquid form and which is adapted for the purpose. This coating is commonly called "enamel" in the trade, and we shall hereinafter refer to this coating as "enamel" but with the understanding that the term is used to include any coating material.

Our invention includes the provision of a removable, more or less flexible casing, which is clamped around the pipes at opposite sides of the casing and which acts as an enclosure or partial enclosure for the coupling together with a hose communicating with the lower portion of the casing and through which hot enamel in liquid form is forced by a pump from a heated container, and the operation of the pump is preferably controlled manually so that the enamel may fill the casing from the bottom upwardly, and the surplus which does not adhere to the parts of the coupling can be withdrawn through the bottom of the casing and returned to the source of supply.

With these and other objects in view, the invention consists in certain novel features of construction and combinations and arrangements of parts which will be more fully hereinafter described and pointed out in the claims.

In the accompanying drawings—

Figure 1 is a view, partly in elevation and partly in section, illustrating our improved apparatus in operative position;

Figure 2 is an enlarged view in longitudinal section through our improved casing located on a pipe and coupling, said pipe and coupling being shown in elevation;

Figure 3 is a fragmentary sectional view, showing one manner of clamping the end portions of the casing to the pipes at opposite sides of the coupling;

Figure 4 is a view taken in section on the line 4—4 of Figure 2, showing the casing partially filled with enamel;

Figure 5 is a view in transverse section through the coupling after the same has been completely coated with enamel;

Figure 6 is a view in longitudinal section through the pipes and coupling after the enameling operation is completed;

Figure 7 is a fragmentary view in elevation of a forked lever which may be utilized in clamping the covering in position.

Our improved apparatus includes a supply tank 1, which is preferably of the wheeled type and in which the enamel 2 may be kept in molten form through the medium of any source of heat.

3 represents a pipe which extends into the fluid enamel and through which the enamel is drawn by means of a pump 4 manually operated by a crank wheel 6 operatively connected to the pump through the medium of shafts 7 and 8 and miter gears 9', although of course the invention is not limited to any particular mechanism for operating the pump.

The pipe 9 extends outwardly from the tank 1 and has a flexible hose or pipe 10 connected thereto, and this pipe 10 is secured to and is in open communication with the bottom of our improved casing 11.

The casing 11 may be composed of any suitable material but we preferably employ a suitable band 12 around which a waterproof fabric covering 13 is secured, and this fabric covering 13 extends beyond the ends of the band 12 and is of general conical form constituting tapering ends 14 on the casing, said tapering ends having cables 15 secured therein so as to provide a construction of sufficient strength to enable the conical ends to be gripped around pipes 16, 16 at the opposite sides of the coupling to be coated.

In Figure 2 a standard type of coupling is illustrated, which includes a coupling ring 17 having flanged rings 18 at its ends secured together by bolts 19 and nuts 20.

The casing 11 is of such material that it may be readily opened and closed, that is to say, the casing is not a continuous circle but constitutes an open encasement with the ends brought together at the top, and the ends of the casing are preferably provided with hooks 21 which engage over the upper bolt 19 and hold the intermediate portion of the casing in proper formation around the coupling.

The conical or tapering and flexible ends of the casing are clamped tightly around the pipes 16 so as to prevent the enamel from running out of the ends of the casing. To permit this clamping or securing action of the ends of the casing, we preferably provide said end portions with eyes 23 and employ a forked lever 24, such as shown in Figure 7.

The furcations of this bifurcated or forked lever have hooks 25 thereon which engage in the eyes 23 of the end portions of the casing, and when said lever is swung to the left of Figure 3 these end portions of the casing will be tightly clamped about the pipes and are so held during the operation of the coating of the coupling and a small portion of each pipe adjacent the coupling.

The operation is as follows:

After the casing 11 is clamped around the pipes and enclosed the coupling, as above explained, the pump 4 is operated to force the liquid enamel into the bottom of the casing and through the casing up to the desired level. A practical level for efficiency is indicated in Figure 4, and after the coupling is subjected to the enamel for a sufficient length of time, which is a very short time, to enable the parts to be thoroughly coated with the enamel, the pump 4 is reversed and the surplus enamel is drawn off through the bottom of the casing and returned to the tank 1. The upper portion of the coupling and the upper bolt which are not properly coated may be easily coated by hand so that all parts of the coupling are thoroughly coated with the enamel, as illustrated in Figure 5 of the drawings.

It is of course to be understood that the invention is not limited to the specific details of construction of the casing nor to the specific form of enamel supply device, as we desire to cover broadly the idea of some supply device in combination with a pump and a casing around the coupling member which enables the pump to fill or partially fill the casing and thoroughly coat the coupling through the medium of a supply from the bottom of the casing, and the latter to draw off this surplus coating leaving the coupling or that portion thereof difficult to coat thoroughly treated.

In the operation of the device at the place of work it is common to dig a trench 26 for the reception of the pipe and place supports 27 across the ditch during the coupling of the pipe sections and the coating of the pipes, as indicated in Figure 1 of the drawings, and our apparatus is adapted for use in coating the couplings of pipe when the pipe is so positioned. In other words, the apparatus is for field use or at the point of work as distinguished from a factory operation, and the means employed are most efficient for the purpose stated.

In practice, it is common to coat the pipes leaving the end portions free of coating until after the coupling is in place and then coat the coupling, and the end portions of the pipe. With my improved apparatus when the coupling and end portions of the pipe are coated, a small space, as indicated at 28 in Figure 6, is uncoated and this must be coated by hand.

Various changes and alterations might be made in the general form of the parts described without departing from our invention and hence we do not limit ourselves to the precise details set forth but consider ourselves at liberty to make such changes and alterations as fairly fall within the power and scope of the appended claims.

We claim:

1. An apparatus for coating flanged couplings including a source of supply, a removable casing having an opening at its upper portion and adapted to be temporarily secured around and enclose a coupling, means at the edges of the casing to grip the pipes and prevent leakage and a pump adapted to force liquid coating into the bottom of the casing to immerse the coupling in the coating and then draw the surplus coating from the casing back to the source of supply.

2. An apparatus of the character described, including a casing having an opening at its upper portion and adapted to be located around a coupling, tapering flexible ends on the casing, means for clamping the ends around the pipes adjacent the coupling and forming a liquid enclosure, a pipe communicating with the bottom of the lower portion of the casing, and a pump operatively connected to the pipe and adapted to force a supply of liquid coating into the casing and withdraw the same therefrom.

3. An apparatus of the character stated, including a removable split casing having an opening at its upper portion and adapted to be positioned around a pipe coupling, means for clamping the ends of the casing to the pipes adjacent the coupling, a flexible hose or pipe connected to the bottom of the casing, and a manually operated pump communicating with a source of supply and with said pipe and adapted to force liquid coating into the casing from the bottom thereof and withdraw liquid from the casing.

4. An apparatus of the character described, including a casing adapted to be positioned around a coupling, hooks on the casing adapted to engage a bolt of the coupling, tapering flexible ends on the coupling with cables secured therein, eyes on said cables, a forked lever having hooks thereon receiving the eyes and adapted to clamp the ends of the casing around pipes adjacent the coupling, and means for supplying liquid coating through the bottom of the casing and withdrawing the same therefrom.

5. An apparatus of the character described, including a casing adapted to be positioned around a coupling, hooks on the casing adapted to engage a bolt of the coupling, tapering flexible ends on the coupling, eyes on said flexible ends, a forked lever having hooks thereon receiving the eyes and adapted to clamp the ends of the casing around pipes adjacent the coupling, means for supplying liquid coating through the bottom of the casing and withdrawing the same therefrom, said means including a manually operated pump, and a source of coating supply.

Signed at New York, in the county of New York, and State of New York, this 27th day of December, A. D. 1928.

HUGH M. COOK.
WILLIAM H. T. THORNHILL.